US012078012B2

(12) United States Patent
Caillat et al.

(10) Patent No.: US 12,078,012 B2
(45) Date of Patent: Sep. 3, 2024

(54) ELECTROMECHANICAL ACTUATOR AND CLOSURE, COVERING OR SOLAR PROTECTION INSTALLATION COMPRISING SUCH AN ELECTROMECHANICAL ACTUATOR

(71) Applicant: SOMFY ACTIVITES SA, Cluses (FR)

(72) Inventors: Jonathan Caillat, Annecy (FR); Thomas Garcia, Cluses (FR); Sébastien Petite, Ayse (FR)

(73) Assignee: SOMFY ACTIVITES SA, Cluses (FR)

( * ) Notice: Subject to any disclaimer, the term of this patent is extended or adjusted under 35 U.S.C. 154(b) by 165 days.

(21) Appl. No.: 17/610,275

(22) PCT Filed: May 14, 2020

(86) PCT No.: PCT/EP2020/063456
§ 371 (c)(1),
(2) Date: Nov. 10, 2021

(87) PCT Pub. No.: WO2020/229596
PCT Pub. Date: Nov. 19, 2020

(65) Prior Publication Data
US 2022/0228437 A1 Jul. 21, 2022

(30) Foreign Application Priority Data
May 15, 2019 (FR) ...................................... 1905072

(51) Int. Cl.
*E06B 9/72* (2006.01)
*E06B 9/42* (2006.01)

(52) U.S. Cl.
CPC . *E06B 9/72* (2013.01); *E06B 9/42* (2013.01)

(58) Field of Classification Search
CPC ..................................... E06B 9/72; E06B 9/42
See application file for complete search history.

(56) References Cited

U.S. PATENT DOCUMENTS

| | | | | | |
|---|---|---|---|---|---|
| 11,230,883 | B2 * | 1/2022 | Sonzini | ..................... | E06B 9/72 |
| 2010/0282890 | A1 * | 11/2010 | Ducornetz | .............. | E06B 9/174 242/404 |
| 2015/0034259 | A1 * | 2/2015 | Bohlen | ..................... | E06B 9/72 160/310 |
| 2018/0259033 | A1 * | 9/2018 | Basutto | ..................... | E06B 9/72 |
| 2020/0347672 | A1 * | 11/2020 | Sonzini | ..................... | E06B 9/44 |

FOREIGN PATENT DOCUMENTS

| | | | | |
|---|---|---|---|---|
| FR | 3072115 A1 * | 4/2019 | ............. | E06B 9/171 |
| WO | 2019/072842 | 4/2019 | | |

OTHER PUBLICATIONS

International Search Report for PCT/EP2020/063456 mailed Jul. 30, 2020, 4 pages.
Written Opinion of the ISA for PCT/EP2020/063456 mailed Jul. 30, 2020, 7 pages.
Search Report for FR190502 dated Jan. 24, 2020, 2 pages.

* cited by examiner

*Primary Examiner* — Beth A Stephan
(74) *Attorney, Agent, or Firm* — NIXON & VANDERHYE

(57) ABSTRACT

The present disclosure relates to determining visual equipment for a patient or user. In an embodiment, a machine learning-based approach considers the face of a user in context of a database of labeled faces and visual equipment, each of the labeled images reflected the aesthetic value of a proposed visual equipment relative to the face of the patient or wear out.

20 Claims, 9 Drawing Sheets

ELECTROMECHANICAL ACTUATOR AND CLOSURE, COVERING OR SOLAR PROTECTION INSTALLATION COMPRISING SUCH AN ELECTROMECHANICAL ACTUATOR

This application is the U.S. national phase of International Application No. PCT/EP2020/063456 filed May 14, 2020 which designated the U.S. and claims priority to FR Patent Application No. 1905072 filed May 15, 2019, the entire contents of each of which are hereby incorporated by reference.

BACKGROUND OF THE INVENTION

Field of the Invention

The present invention relates to an electromechanical actuator comprising a torque support, intended to be assembled at least partly inside a casing of the electromechanical actuator, as well as a closure, covering or solar protection installation comprising a screen which can be rolled on a winding tube driven in rotation by such an electromechanical actuator.

Generally, the present invention relates to the field of covering devices comprising a motorized drive device moving a screen, between at least a first position and at least a second position.

A motorized drive device comprises an electromechanical actuator of a movable closure, covering or solar protection element, such as a shutter, a door, a grid, a blind or any other equivalent material, hereinafter called a screen.

Description of the Related Art

Electromechanical actuators are already known, such as for example in WO 2019/072842 A1, for a closure, covering or solar protection installation. These electromechanical actuators comprise an electric motor, a casing, and a torque support. The electric motor is assembled within the casing, in an assembled configuration of the electromechanical actuator. The torque support is arranged at a first end of the casing, in the assembled configuration of the electromechanical actuator. The torque support comprises two assembly elements. These assembly elements of the torque support are two notches, each in the form of a radial projection, diametrically opposed relative to an axis of rotation of the electromechanical actuator. In addition, the casing comprises two assembly elements. These assembly elements of the casing are two diametrically opposed indentations, relative to the axis of rotation. The notches of the torque support are configured to be assembled with the indentations of the casing, in the assembled configuration of the electromechanical actuator, so as to rotationally block the torque support to the casing.

However, these electromechanical actuators present the disadvantage that the two assembly elements of the torque support are identical and the two assembly elements of the casing are identical.

In this way, the assembly elements of the torque support and of the casing only allow the torque support to be assembled relative to the casing according to a first position or according to a second position, with a 180° orientation relative to each other, in a functional assembly configuration of the electromechanical actuator.

The functional assembly configuration of the electromechanical actuator corresponds to a final assembly configuration of the electromechanical actuator in which the electromechanical actuator is suitable for use in the closure, covering or solar protection installation.

The first and second assembly positions of the torque support relative to the casing allow for ease of industrialization of the electromechanical actuator, since the torque support and the casing are respectively symmetrical around the axis of rotation.

Therefore, the assembly of the torque support relative to the casing has only two assembly positions to ensure a functional assembly of the electromechanical actuator.

SUMMARY OF THE INVENTION

The present invention is intended to solve the aforementioned disadvantages and to provide an electromechanical actuator for a closure, covering or solar protection installation, as well as a closure, covering or solar protection installation comprising such an electromechanical actuator, which makes it possible to guarantee an assembly of a torque support of the electromechanical actuator relative to a casing of the electromechanical actuator according to at least a first position, in a first functional assembly configuration of the electromechanical actuator, and according to at least a second position, in an additional second assembly configuration of the electromechanical actuator, different from the first functional assembly configuration of the electromechanical actuator.

In this regard, the present invention is directed, according to a first aspect, to an electromechanical actuator for a closure, covering or solar protection installation, the electromechanical actuator comprising at least:

- an electric motor,
- a casing, the electric motor being mounted within the casing in an assembled configuration of the electromechanical actuator, the casing comprising at least an assembly element, and
- a torque support, the torque support arranged at a first end of the casing in the assembled configuration of the electromechanical actuator, the torque support comprising at least a first assembly element.

The first assembly element of the torque support is configured to be assembled with the assembly element of the casing, according to a first assembly configuration of the torque support relative to the casing, the first assembly configuration corresponding to a functional assembly configuration of the electromechanical actuator.

According to the invention, the torque support comprises, in addition, at least a second assembly element. The second assembly element of the torque support is different from the first assembly element of the torque support. The second assembly element of the torque support is configured to be assembled with the assembly element of the casing, according to a second assembly configuration of the torque support relative to the casing, the second assembly configuration corresponding to a testing configuration of the electromechanical actuator. The torque support is configured to be oriented relative to the casing, around an axis of rotation of the electromechanical actuator and in the first assembly configuration, with a first orientation of the torque support relative to the casing. The torque support is also configured to be oriented relative to the casing, around the axis of rotation and in the second assembly configuration, with a second orientation of the torque support relative to the casing. In addition, the first and second orientations of the torque support relative to the casing are offset from each other, around the axis of rotation, by a predetermined non-zero angular value.

Thus, the first assembly element of the torque support is different from the second assembly element of the torque support, such that, according to the first assembly configuration of the torque support relative to the casing, the first assembly element of the torque support is assembled with the assembly element of the casing to ensure a functional assembly configuration of the electromechanical actuator and that, according to the second assembly configuration of the torque support relative to the casing, the second assembly element of the torque support is assembled with the assembly element of the casing to ensure a testing configuration of the electromechanical actuator.

In this manner, such an electromechanical actuator ensures that the torque support is assembled relative to the casing according to at least a first position, in a first functional assembly configuration of the electromechanical actuator, and according to at least a second position, in an additional second electromechanical actuator assembly configuration that is the testing configuration of the electromechanical actuator and is therefore different from the first functional assembly configuration of the electromechanical actuator.

According to an advantageous feature of the invention, the torque support comprises at least a notch. In addition, the notch of the torque support is configured to be closed by the casing, in the first assembly configuration, and to be open relative to the casing, in the second assembly configuration.

According to another advantageous feature of the invention, the notch of the torque support is provided in the or each second assembly element of the torque support.

According to another advantageous feature of the invention, the notch of torque support is configured for the passage of at least a power supply cable, from the interior of the casing to the exterior of the casing, in the second assembly configuration.

According to another advantageous feature of the invention, the first and second orientations of the torque support relative to the casing are determined by an angular positioning of the first assembly element of the torque support relative to the second assembly element of the torque support, around the axis of rotation.

According to another advantageous feature of the invention, each of the first and second assembly elements of the torque support and the assembly element of the casing are press-fit assembly elements. In addition, each of the first and second assembly elements of the torque support is configured to cooperate with the assembly element of the casing in a form-fitting manner.

According to another advantageous feature of the invention, the first assembly element of the torque support comprises a first stop. The second assembly element of the torque support comprises a second stop. The casing comprises an edge at the first end of the casing. The edge of the casing is configured to abut the first stop of the first assembly element of the torque support, in the first assembly configuration, so that the torque support is inserted partially within the casing according to a first predetermined distance parallel to an axis of rotation of the electromechanical actuator. The edge of the casing is also configured to abut the second stop of the second assembly element of the torque support, in the second assembly configuration, so that the torque support is inserted partially within the casing according to a second predetermined distance parallel to the axis of rotation. In addition, the first predetermined distance is greater than the second predetermined distance.

According to another advantageous feature of the invention, the electromechanical actuator comprises at least a battery, the battery being arranged inside the casing, in the assembled configuration of the electromechanical actuator.

According to another advantageous feature of the invention, the electromechanical actuator comprises an electronic control unit. In addition, the electronic control unit is configured to be electrically connected to a control tool via an electrical connection, in the second assembly configuration.

According to another advantageous feature of the invention, in the second assembly configuration, the electrical connection between the electronic control unit and the control tool is implemented by the power supply cable extending through the notch provided in the torque support.

The present invention is directed, according to a second aspect, to a closure, covering or solar protection installation comprising a screen, a winding tube and an electromechanical actuator, according to the invention and as mentioned above, the screen being able to be rolled on the winding tube and the winding tube being arranged so as to be driven in rotation by the electromechanical actuator.

This installation presents similar features and advantages to those described above, relative to the electromechanical actuator according to the invention.

BRIEF DESCRIPTION OF THE DRAWINGS

Further features and advantages of the invention will become apparent from the following description, made with reference to the attached drawings, given as non-limiting examples.

DESCRIPTION OF THE PREFERRED EMBODIMENTS

Figure 1:
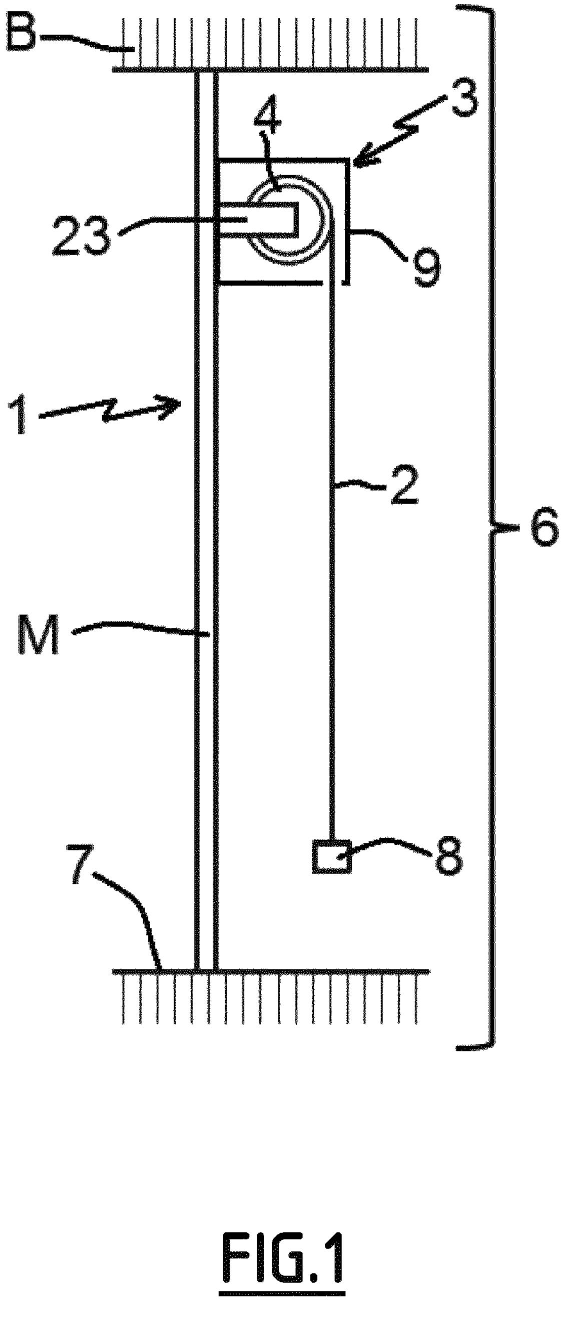
FIG. 1 is a schematic cross-sectional view of an installation according to an embodiment of the invention.
Figure 2:
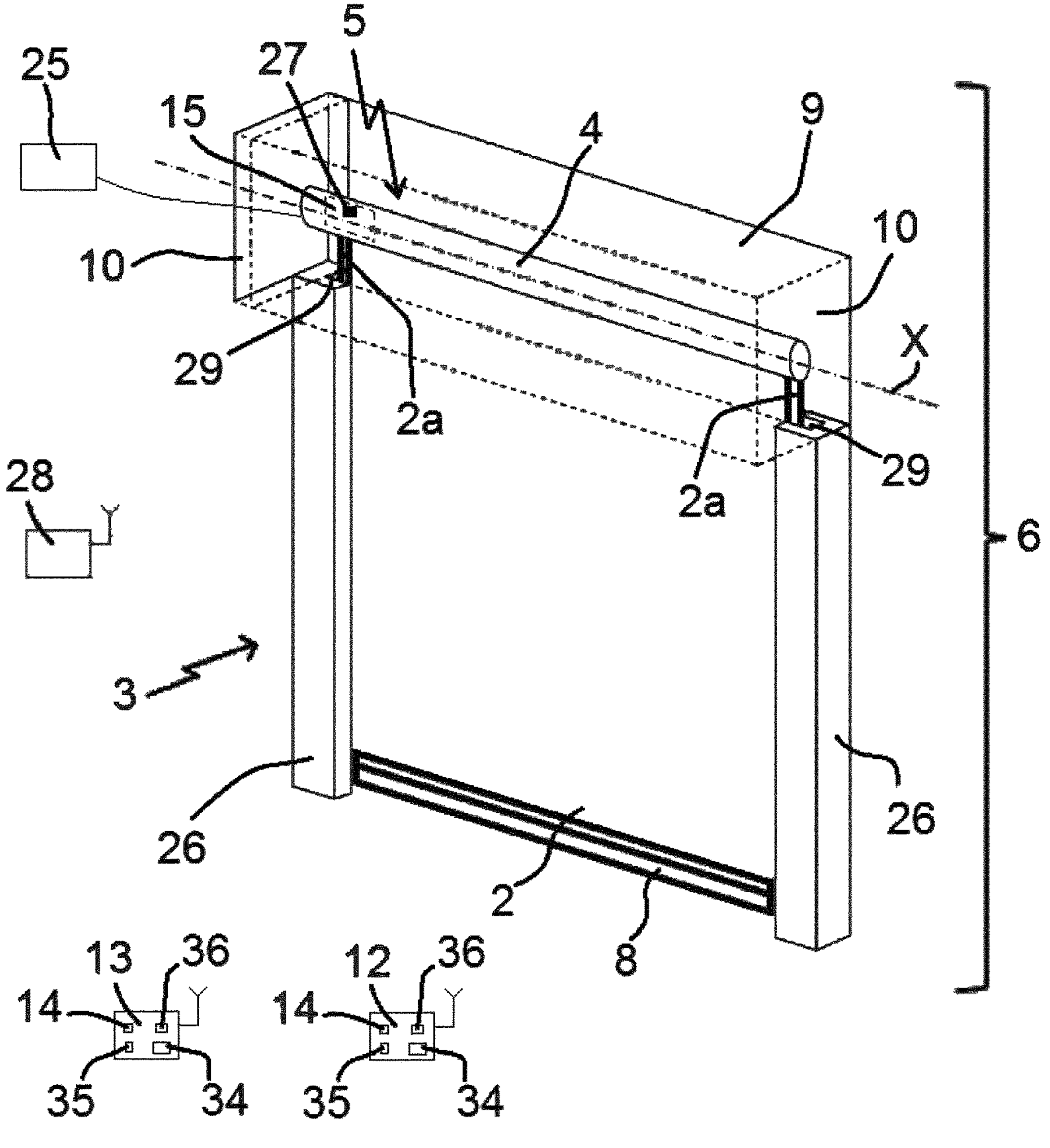
FIG. 2 is a schematic perspective view of the installation illustrated in FIG. 1.

First of all is described, with reference to FIGS. 1 and 2, an installation 6 according to the invention and installed in a building B comprising an opening 1, window or door, equipped with a screen 2 belonging to a closure, covering or solar protection device 3, in particular a motorized blind.

The closure, covering or solar protection device 3 is hereinafter referred to as the "covering device". The covering device 3 comprises the screen 2.

The covering device 3 may comprise a blind, in particular a fabric, rollable, pleated, or slatted blind. The covering device 3 may also comprise a roller shutter or a roller gate. The present invention is applicable to all types of covering device.

With reference to FIGS. 1 and 2, a roller blind according to an embodiment of the invention is described.

Figure 3:
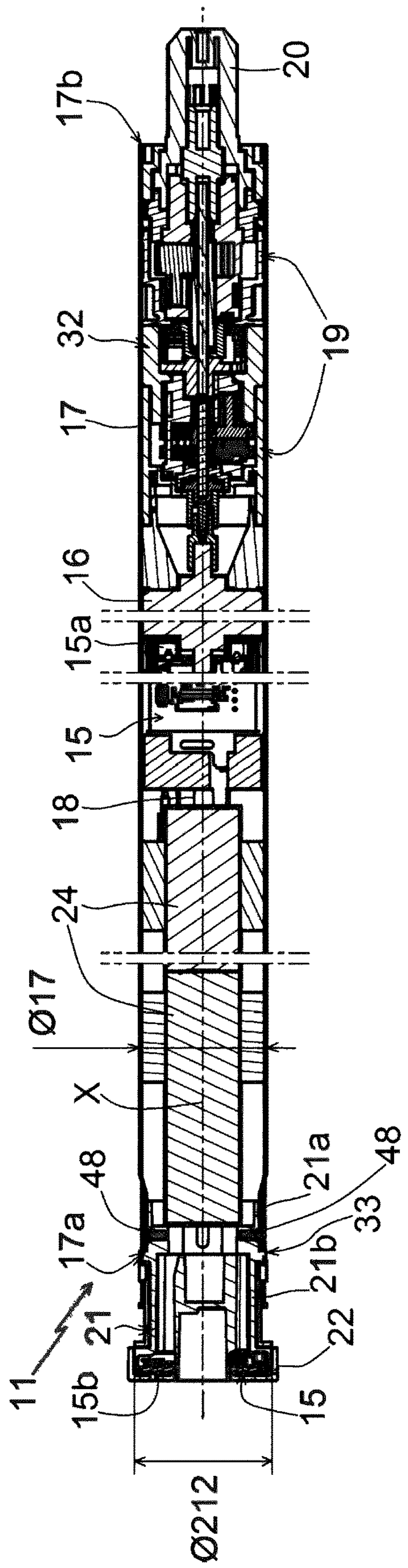
FIG. 3 is a schematic cross-sectional view of an electromechanical actuator of the installation illustrated in FIGS. 1 and 2, according to a sectional plane passing through an axis of rotation of an output shaft of the electromechanical actuator.
Figure 4:
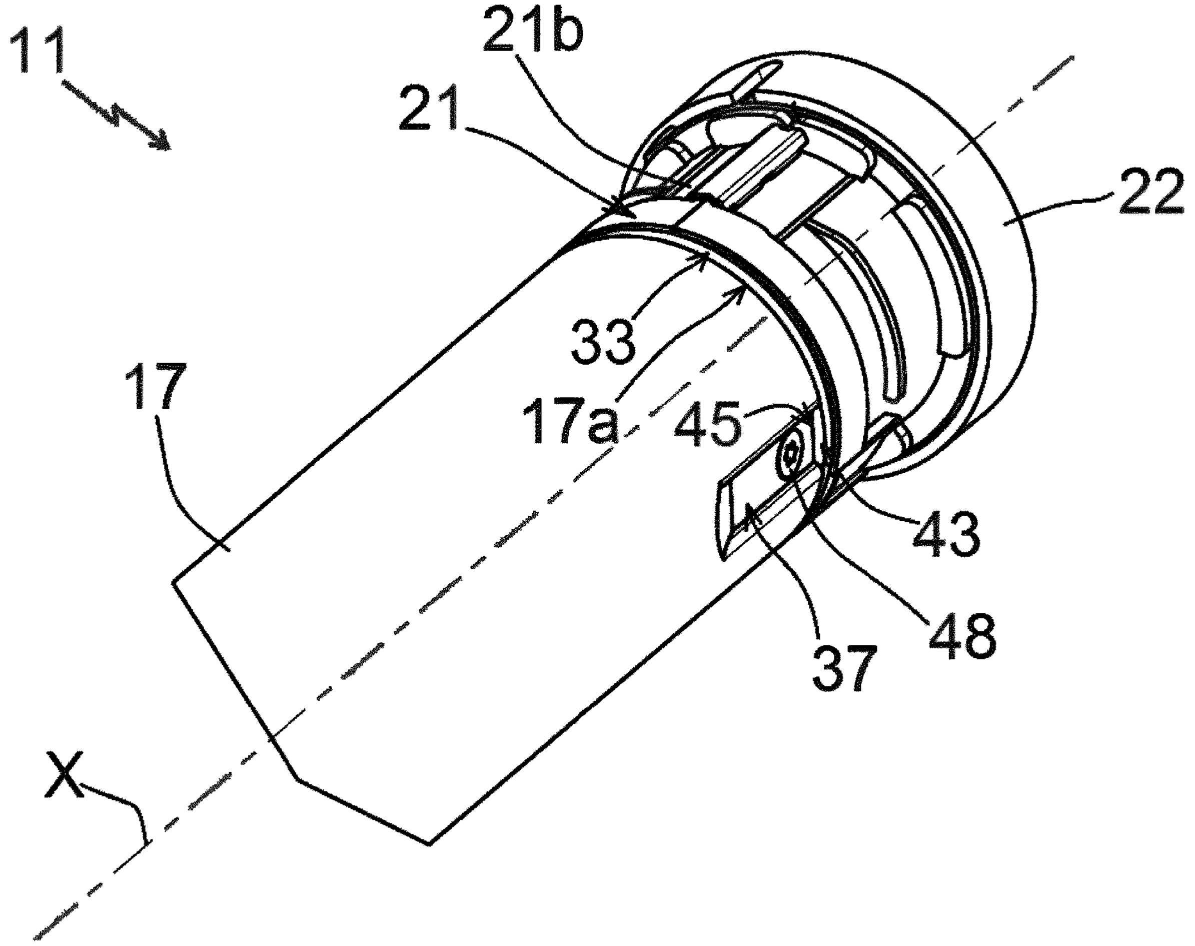
FIG. 4 is a schematic perspective view of a part of the electromechanical actuator illustrated in FIG. 3, showing a part of the casing of the electromechanical actuator and a torque support, in a first assembly configuration.
Figure 5:
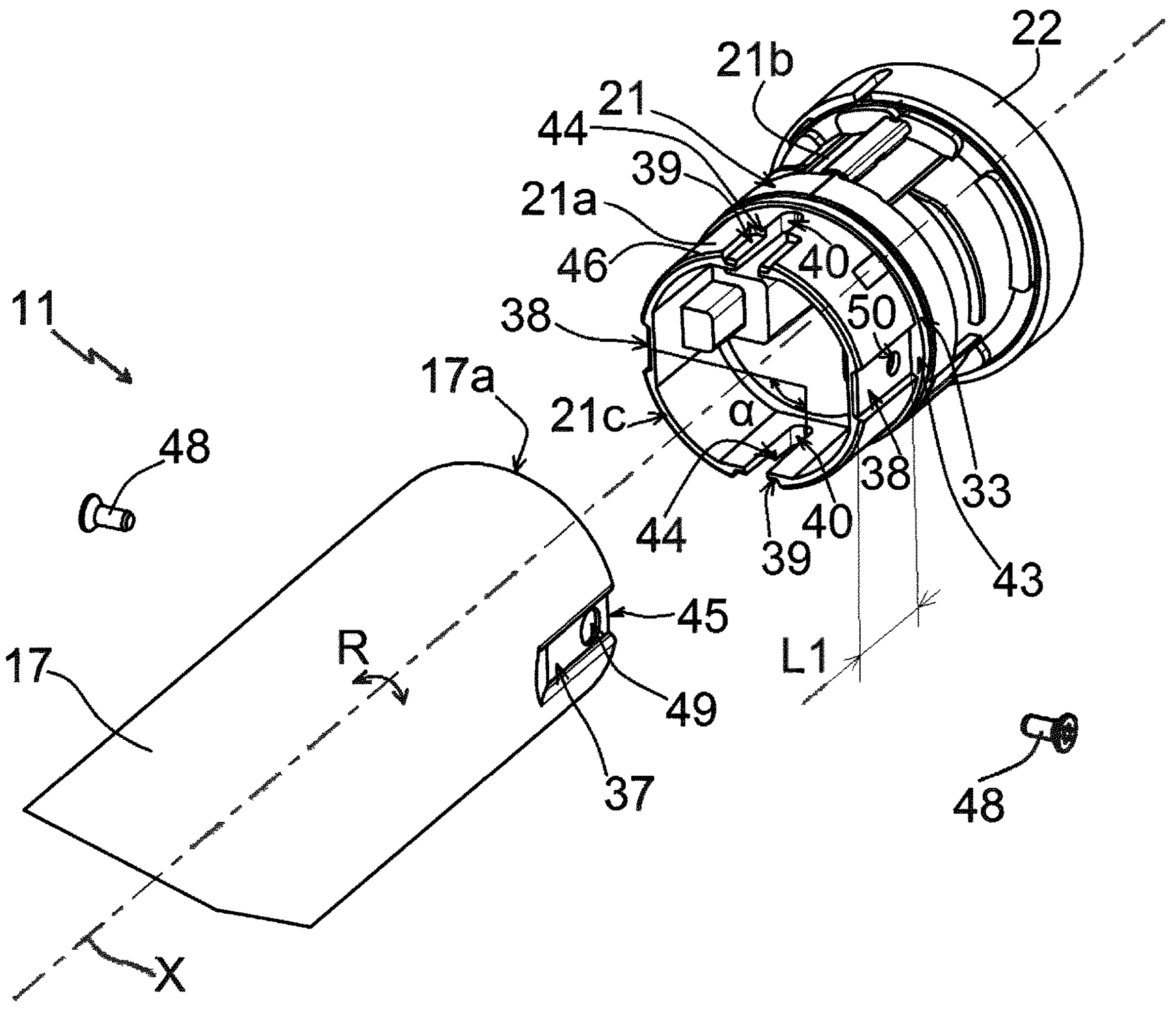
FIG. 5 is a schematic exploded and perspective view of the part of the electromechanical actuator illustrated in FIG. 4, according to the first assembly configuration.
Figure 6:
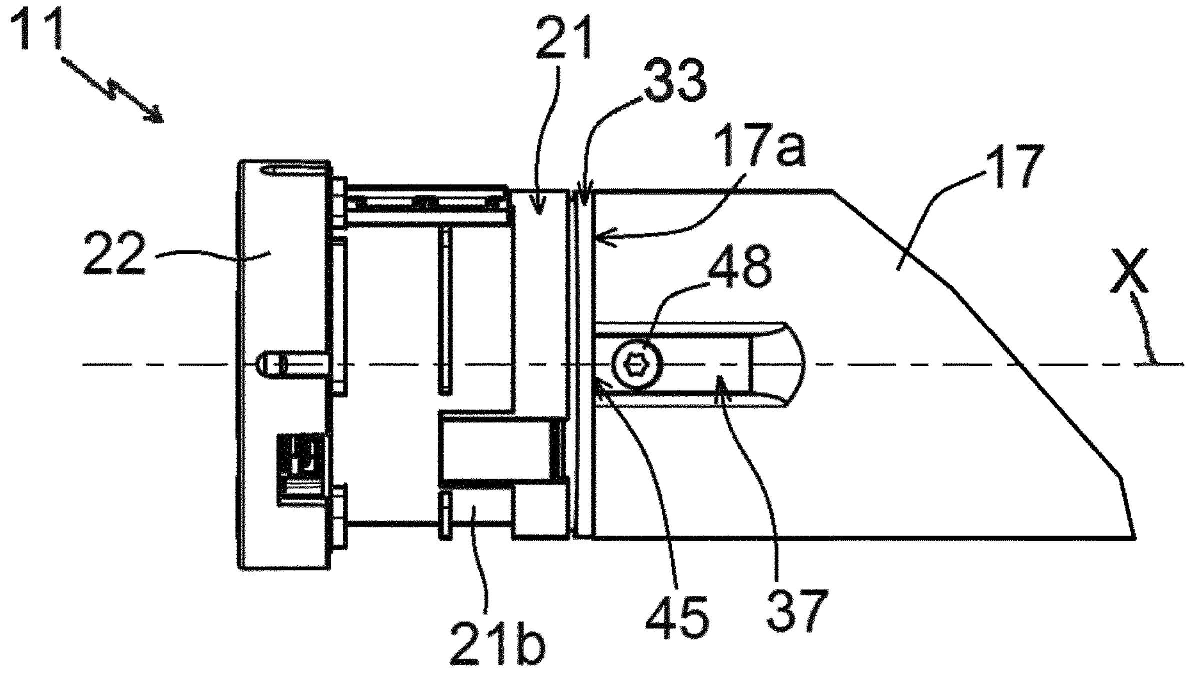
FIG. 6 is a schematic side view of the part of the electromechanical actuator illustrated in FIGS. 4 and 5, according to the first assembly configuration.
Figure 7:
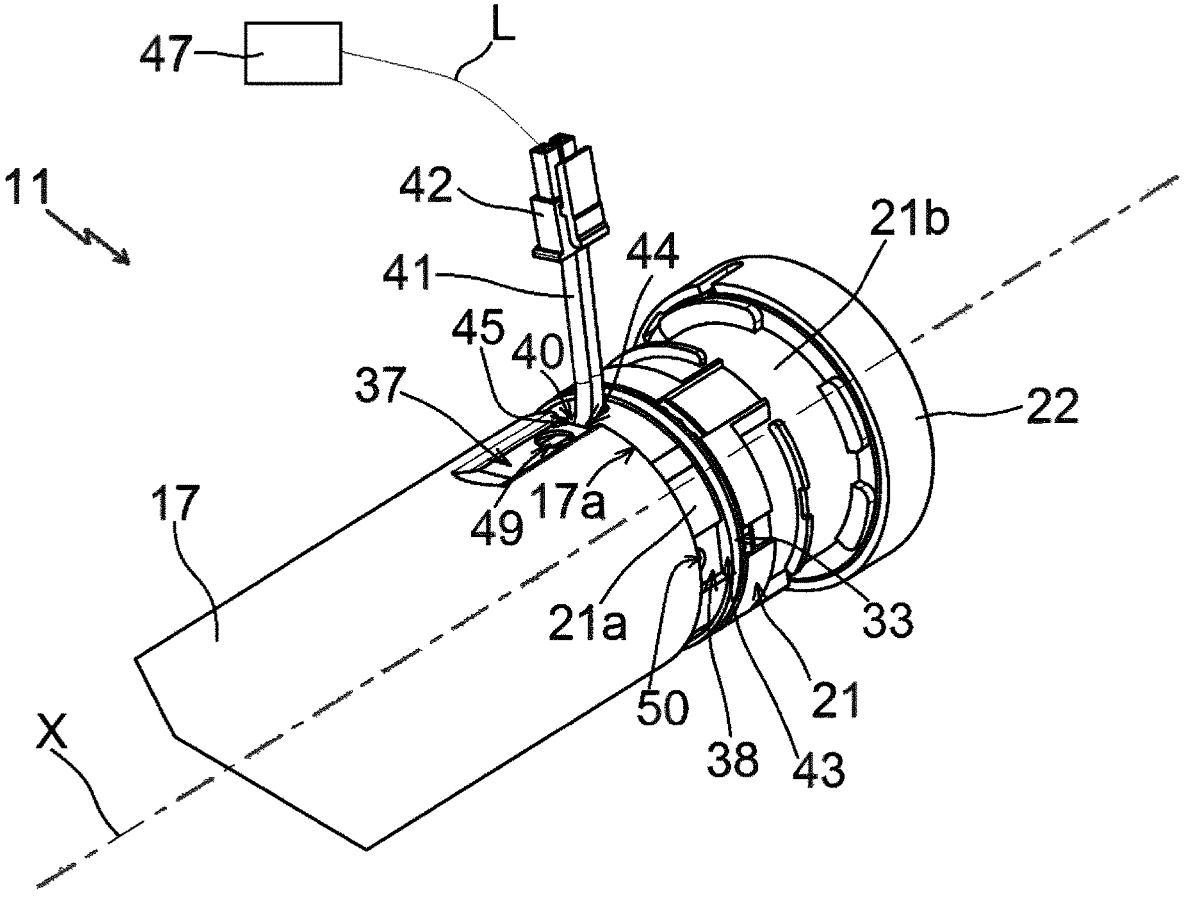
FIG. 7 is a schematic perspective view of a part of the electromechanical actuator illustrated in FIG. 3, showing a part of the casing of the electromechanical actuator and the torque support, in a second assembly configuration.
Figure 8:
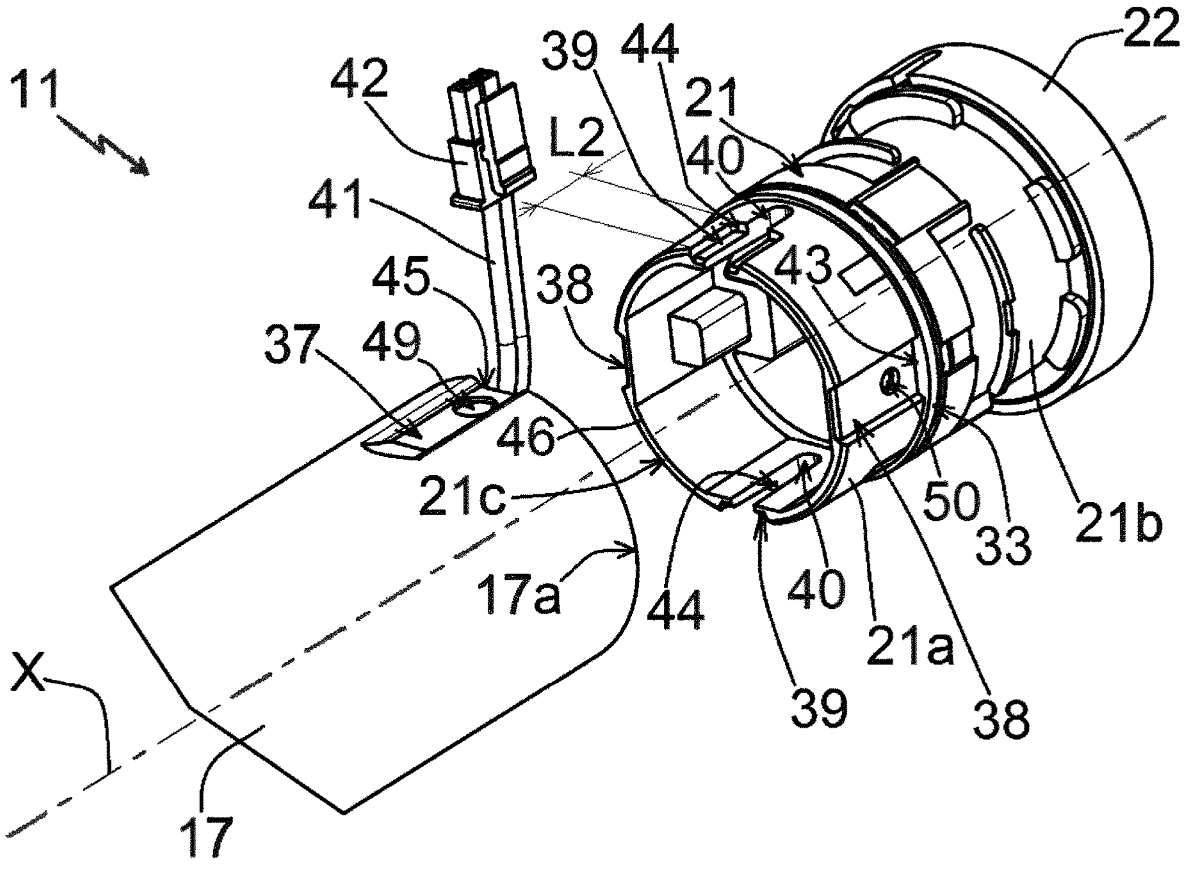
FIG. 8 is a schematic exploded perspective view of the part of the electromechanical actuator shown in FIG. 7, according to the second assembly configuration.
Figure 9:
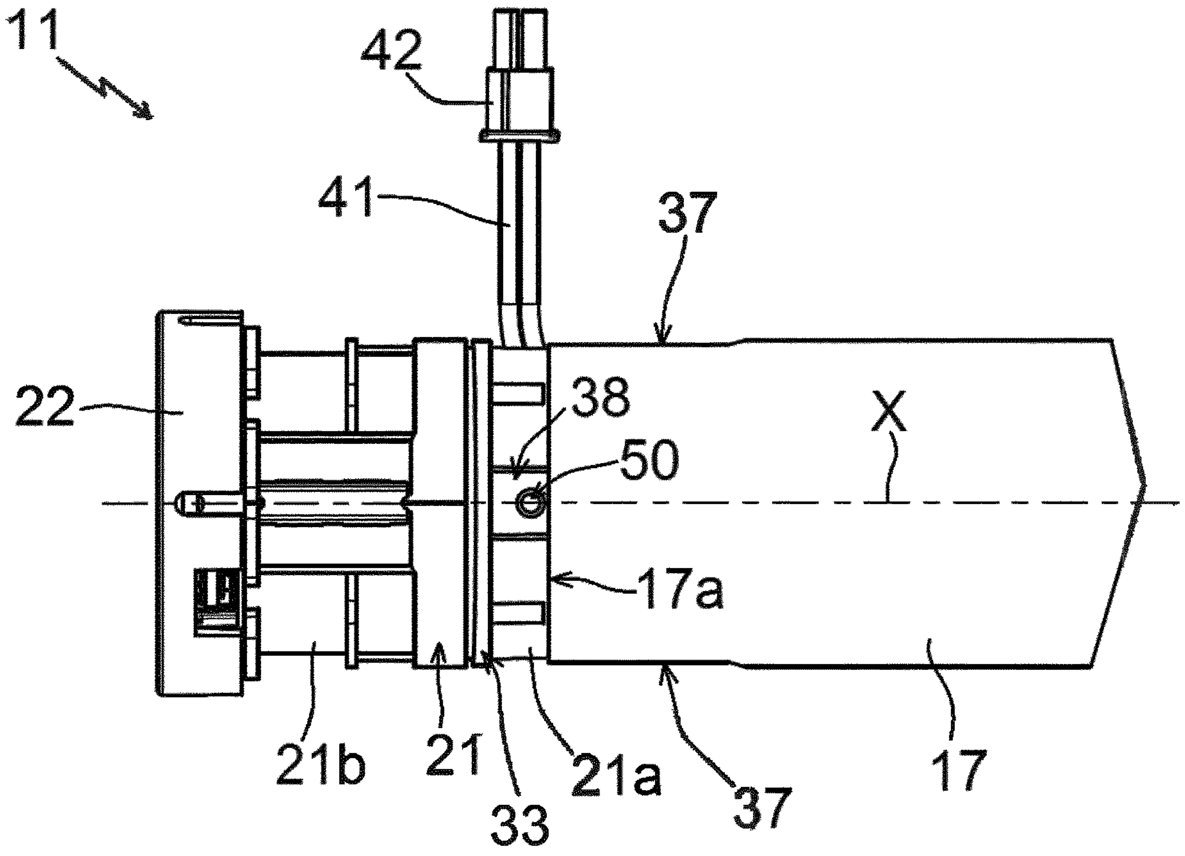
FIG. 9 is a schematic side view of the part of the electromechanical actuator illustrated in FIGS. 7 and 8, according to the second assembly configuration.

The covering device 3 comprises a winding tube 4 and a motorized drive device 5. The motorized drive device 5 comprises an electromechanical actuator 11, as shown in FIG. 3.

The screen 2 of the covering device 3 is rolled up on the winding tube 4 driven by the motorized drive device 5. Thus, the screen 2 is movable between a rolled-up position, in particular a high position, and an unrolled position, in particular a low position.

The screen 2 of the covering device 3 is a closure, covering and/or solar protection screen, which can be rolled up and unrolled around the winding tube 4, the inner diameter of which is substantially larger than the outer diameter of the electromechanical actuator 11, so that the electromechanical actuator 11 can be inserted into the winding tube 4, when the covering device 3 is assembled.

Advantageously, the covering device 3 comprises a holding device 9, 23.

Advantageously, the holding device 9, 23 may comprise two supports 23. One support 23 is arranged at each end of the winding tube 4, in an assembled configuration of the covering device 3.

Thus, the winding tube 4 is held by the supports 23. Only one of the supports 23 is visible in FIG. 1. The supports 23 allow the covering device 3 to be mechanically connected to the structure of the building B, in particular to a wall M of the building B.

Advantageously, the holding device 9, 23 may comprise a box 9. In addition, the winding tube 4 and at least part of the screen 2 are housed inside the box 9, in the assembled configuration of the covering device 3.

Generally, the box 9 is arranged above the opening 1, or at the top of the opening 1.

Here and as illustrated in FIG. 1, the supports 23 are also housed inside the box 9.

Alternatively, as shown in FIG. 2, the winding tube 4 is held by means of the box 9, in particular by means of the cheeks 10 of the box 9, without using supports, such as the above-mentioned supports 23.

Advantageously, the covering device 3 may also comprise two lateral slides 26, as illustrated in FIG. 2. Each lateral slide 26 comprises a groove 29. Each groove 29 of one of the side slides 26 cooperates, in other words is configured to cooperate, with a side edge **2*a* of the screen 2, in the assembled configuration of the covering device 3, so as to guide the screen 2, when rolling up and unrolling the screen 2 around the winding tube 4**.

The electromechanical actuator 11 is, for example, of tubular type. This allows the winding tube 4 to rotate around an axis of rotation X, so as to unroll or roll up the screen 2 of the covering device 3.

Thus, the screen 2 can be rolled up and down on the winding tube 4. In the assembled state, the electromechanical actuator 11 is inserted into the winding tube 4.

Advantageously, the covering device 3 also comprises a load bar 8 for exerting tension on the screen 2.

The roller blind, which forms the covering device 3, comprises a fabric, forming the screen 2 of the roller blind 3. A first end of the screen 2, in particular the upper end of the screen 2, in the assembled configuration of the covering device 3, is attached to the winding tube 4. In addition, a second end of the screen 2, in particular the lower end of the screen 2, in the assembled configuration of the covering device 3, is attached to the load bar 8.

Here, the fabric forming the screen 2 is made from a textile material.

In an embodiment, not shown, the first end of the screen 2 presents a hem through which a rod, in particular of plastic, is inserted. This hem at the first end of the screen 2 is obtained by means of a seam in the fabric forming the screen 2. When the screen 2 is assembled on the winding tube 4, the hem and the rod at the first end of the screen 2 are inserted by sliding into a groove formed on the outer surface of the winding tube 4, in particular over the entire length of the winding tube 4, so that the screen 2 is fixed to the winding tube 4 and the screen 2 can be rolled up and down around the winding tube 4.

In the case of a roller blind, the rolled-up position corresponds to a predetermined upper end-of-travel position, or to the bearing of the load bar 8 of the screen 2 against an edge of a box 9 of the roller blind 3, and the unrolled lower position corresponds to a predetermined lower end-of-travel position, or to the bearing of the load bar 8 of the screen 2 against a sill 7 of the opening 1, or to the complete unrolling of the screen 2.

Advantageously, the motorized drive device 5 is controlled by a control unit. The control unit may be, for example, a local control unit 12 or a central control unit 13.

Advantageously, the local control unit 12 can be connected, in a wired or wireless manner, to the central control unit 13.

Advantageously, the central control unit 13 can control the local control unit 12, as well as other similar local control units distributed in the building.

Preferably, the motorized drive device 5 is configured to execute the commands for unrolling or rolling up the screen 2 of the covering device 3, which can be emitted, in particular, by the local control unit 12 or the central control unit 13.

The installation 6 comprises either the local control unit 12, the central control unit 13, or the local control unit 12 and the central control unit 13.

The electromechanical actuator 11 belonging to the installation 6 of FIGS. 1 and 2 is now described in more detail with reference to FIG. 3.

The electromechanical actuator 11 comprises an electric motor 16. The electric motor 16 comprises a rotor and a stator, not shown, positioned coaxially around the axis of rotation X of the winding tube 4 in the assembled configuration of the motorized drive device 5.

Means for controlling the electromechanical actuator 11, allowing the movement of the screen 2 of the covering device 3, comprises at least an electronic control unit 15. This electronic control unit 15 is able to operate the electric motor 16 of the electromechanical actuator 11, and, in particular, to allow the supply of electrical energy to the electric motor 16.

Thus, the electronic control unit 15 controls, in particular, the electric motor 16, so as to open or close the screen 2, as previously described.

The control means of the electromechanical actuator 11 comprise hardware and/or software means.

As a non-limiting example, the hardware means may comprise at least a microcontroller, not shown.

Advantageously, the electronic control unit 15 also comprises a first communication module 27, as illustrated in FIG. 2, in particular for receiving command orders, the command orders being emitted by an order transmitter, such as the local control unit 12 or the central control unit 13, these orders being intended to control the motorized drive device 5.

Preferably, the first communication module 27 of the electronic control unit 15 is of a wireless type. In particular, the first communication module 27 is configured to receive radio command orders.

Advantageously, the first communication module 27 may also allow the reception of command orders transmitted by wired means.

Advantageously, the electronic control unit 15, the local control unit 12 and/or the central control unit 13 can be in communication with a weather station located inside the building B or remotely outside the building B, including, in particular, one or more sensors that can be configured to determine, for example, a temperature, a luminosity, or a wind speed, in the case where the weather station is outside the building B.

Advantageously, the electronic control unit 15, the local control unit 12 and/or the central control unit 13 can also be in communication with a server 28, as illustrated in FIG. 2, so as to control the electromechanical actuator 11 according to data made available remotely via a communication network, in particular an Internet network that can be connected to the server 28.

The electronic control unit 15 can be controlled from the local control unit 12 or central control unit 13. The local control unit 12 or central control unit 13 is provided with a control keyboard. The control keyboard of the local control unit 12 or central control unit 13 comprises one or more selection elements 14 and, eventually, one or more display elements 34.

As non-limiting examples, the selection elements may comprise push buttons and/or touch sensitive keys. The display elements may comprise light emitting diodes and/or an LCD (Liquid Crystal Display) or TFT (Thin Film Transistor) display. The selection and display elements can also be made by means of a touch screen.

The local control unit 12 or central control unit 13 comprises at least a second communication module 36.

Thus, the second communication module 36 of the local control unit 12 or central control unit 13 is configured to transmit, in other words emit, command orders, in particular by wireless means, for example radio, or by wired means.

In addition, the second communication module 36 of the local control unit 12 or central control unit 13 may also be configured to receive, in other words receive, command orders, in particular via the same means.

The second communication module 36 of the local control unit 12 or central control unit 13 is configured to communicate, in other words communicate, with the first communication module 27 of the electronic control unit 15.

Thus, the second communication module 36 of the local control unit 12 or central control unit 13 exchanges command orders with the first communication module 27 of the electronic control unit 15, either monodirectional manner or bidirectionally.

Advantageously, the local control unit 12 is a control point, which may be fixed or nomad. A fixed control point can be a control box intended to be fixed on a façade of a wall of the building B or on a face of a window or door frame. A nomad control point may be a remote control, a Smartphone or a tablet.

Advantageously, the local control unit 12 or central control unit 13 also comprises a controller 35.

The motorized drive device 5, in particular the electronic control unit 15, is, preferably, configured to execute movement command orders, in particular closure as well as opening, of the screen 2 of the covering device 3. These command orders can be emitted, in particular, by the local control unit 12 or by the central control unit 13.

The motorized drive device 5 can be controlled by the user, for example by receiving a command order corresponding to a press on the or one of the selection elements 14 of the local control unit 12 or central control unit 13.

The motorized drive device 5 may also be controlled automatically, for example by receiving a command order corresponding to at least a signal from at least a sensor and/or a signal from a clock of the electronic control unit 15, in particular the microcontroller. The sensor and/or the clock may be integrated into the local control unit 12 or into the central control unit 13.

The electromechanical actuator 11 comprises a casing 17, in particular tubular. The electric motor 16 is assembled within the casing 17, in an assembled configuration of the electromechanical actuator 11, in particular according to a first and a second assembly configurations of a torque support 21 relative to the casing 17.

Here, the casing 17 of the electromechanical actuator 11 is cylindrical in shape, in particular rotationally symmetrical.

In an example of an embodiment, the casing 17 is made of a metallic material.

The material of the casing of the electromechanical actuator is not limiting and may be different. In particular, it may be a plastic material.

Advantageously, the electromechanical actuator 11 comprises at least a battery 24. The battery 24 is arranged inside the casing 17, in the assembled configuration of the electromechanical actuator 11, in particular according to the first assembly configuration of the torque support 21 relative to the casing 17.

Thus, the electromechanical actuator 11 is supplied with electrical energy by means of the battery 24.

Here, the electromechanical actuator 11 comprises a power supply cable 18 allowing the supply of electrical energy to the electronic control unit 15 and the electric motor 16, in particular from the battery 24.

Advantageously, the battery 24 is of the rechargeable type.

Advantageously, the battery 24 comprises one or more energy storage elements, not shown. The energy storage elements of the battery 24 may be, in particular, rechargeable accumulators or rechargeable batteries.

Advantageously, the motorized drive device 5 and, in particular, the electronic control unit 15, comprises charging elements configured to charge the battery 24 from the electrical energy supplied by an external power source 25, as shown in FIG. 2.

As a non-limiting example, the external power source 25 is a charger that can be plugged into a wall socket, so as to charge the battery 24 from a mains power supply.

Alternatively, not shown, the external power source 25 is an auxiliary battery, so as to recharge the battery 24.

Thus, the battery 24 can be recharged by means of the auxiliary battery forming the external power source 25, in particular in the case where the covering device 3 is remote from a wall socket.

Advantageously, the electronic control unit 15 comprises a first electronic board 15*a* and a second electronic board 15*b*.

Advantageously, the first electronic board 15*a* is configured to control the electric motor 16. In addition, the second electronic board 15*b* is configured to, in particular, allow the recharging of the battery 24, by means of an electrical connector, not shown, and, eventually, to access the parameter settings and/or configuration functions of the electromechanical actuator 11, by means of selection and, eventually, display elements, not shown.

Here and in a non-limiting way, the charging elements are arranged on the second electronic board 15*b*.

Advantageously, the electromechanical actuator 11 also comprises a gearbox 19 and an output shaft 20.

Advantageously, the gearbox 19 comprises at least one reduction stage. The reduction stage may be an epicyclic type gear train.

The type and the number of reduction stages of the gearbox are not limiting.

Advantageously, the electromechanical actuator 11 also comprises a brake 32.

As non-limiting examples, the brake 32 can be a spring brake, a cam brake, or an electromagnetic brake.

Advantageously, the gearbox 19 and, eventually, the brake 32 are arranged inside the casing 17 of the electromechanical actuator 11, in the assembled configuration of the electromechanical actuator 11, in particular according to the first and second assembly configurations of the torque support 21 relative to the casing 17.

Advantageously, the electromechanical actuator 11 may also comprise a limit end-of-travel and/or obstacle detection device, which may be mechanical or electronic.

The winding tube 4 is driven in rotation around the axis of rotation X and the casing 17 of the electromechanical actuator 11 by being supported via two pivot connections. The first pivot connection is made at a first end of the winding tube 4 by means of a ring, not shown, inserted around a first end 17*a* of the casing 17 of the electromechanical actuator 11. The ring thus makes it possible to create a bearing. The second pivot connection, not shown, is made at a second end of the winding tube 4.

The electromechanical actuator 11 comprises the torque support 21, which may also be referred to as the "actuator head". The torque support 21 is arranged at the first end 17*a* of the casing 17 of the electromechanical actuator 11, in the assembled configuration of the electromechanical actuator 11, in particular according to the first and second assembly configurations of the torque support 21 relative to the casing 17.

The torque support 21 allows the forces exerted by the electromechanical actuator 11 to be taken up and, in particular, to ensure that the forces exerted by the electromechanical actuator 11, in particular the torque exerted by the electromechanical actuator 11, are taken up by the structure of the building B. Advantageously, the torque support 21 also allows forces exerted by the winding tube 4, in particular the weight of the winding tube 4, the electromechanical actuator 11 and the screen 2, to be taken up and ensure that these forces are taken up by the structure of the building B.

Thus, the torque support 21 of the electromechanical actuator 11 allows the electromechanical actuator 11 to be fixed to the holding device 9, 23, in particular to one of the supports 23 or to one of the cheeks 10 of the box 9.

Advantageously, the torque support 21 protrudes at the first end 17*a* of the casing 17 of the electromechanical actuator 11, in particular the end 17*a* of the casing 17 receiving the ring. The ring constitutes, in other words is configured to constitute, a bearing for guiding the winding tube 4 in rotation, in the assembled configuration of the covering device 3.

Advantageously, the torque support 21 of the electromechanical actuator 11 may also allow to close off the first end 17*a* of the casing 17.

Furthermore, the torque support 21 of the electromechanical actuator 11 may allow to support at least a part of the electronic control unit 15.

Advantageously, the torque support 21 comprises a first part 21*a* and a second part 21*b*.

Advantageously, the first part 21*a* of the torque support 21 is configured to cooperate, in other words cooperates, with the casing 17 of the electromechanical actuator 11, in particular in the assembled configuration of the electromechanical actuator 11 and, more particularly, according to the first and second assembly configurations of the torque support 21 relative to the casing 17. In addition, the second part 21*b* of the torque support 21 is configured to cooperate, in other words cooperates, with the holding device 9, 23, in particular in the assembled configuration of the electromechanical actuator 11 in the installation 6 and, more particularly, according to the first assembly configuration of the torque support 21 relative to the casing 17.

Thus, making the torque support 21 comprise the first and second parts 21*a*, 21*b* in a single piece improves the rigidity of the torque support 21.

Advantageously, at least a portion of the first part 21*a* of the torque support 21 is generally cylindrical in shape and is arranged within the casing 17 of the electromechanical actuator 11, in the assembled configuration of the electromechanical actuator 11, in particular according to the first and second assembly configurations of the torque support 21 relative to the casing 17.

Preferably, an outer diameter Ø212 of at least a portion of the second part 21*b* of the torque support 21 is larger than an outer diameter Ø17 of the casing 17 of the electromechanical actuator 11.

Advantageously, the torque support 21 comprises a stop 33 configured to cooperate, in other words cooperates, with the casing 17, at the first end 17*a* of the casing 17, in the assembled configuration of the electromechanical actuator 11, in particular according to the first assembly configuration of the torque support 21 relative to the casing 17.

Thus, the stop 33 of the torque support 21 allows to limit the depression of the first part 21*a* of the torque support 21 into the casing 17, along the direction of the rotation axis X.

In addition, the stop 33 of the torque support 21 delimits the first and second parts 21*a*, 21*b* of the torque support 21 from each other.

Thus, only the first part 21*a* of the torque support 21 is arranged within the casing 17 of the electromechanical actuator 11, as a result of the torque support 21 being pushed into the casing 17, up to the stop 33, in the assembled configuration of the electromechanical actuator 11, in particular according to the first assembly configuration of the torque support 21 relative to the casing 17.

Here, the stop 33 of the torque support 21 is made in the form of a shoulder and, more particularly, in the form of a flange, in particular of cylindrical shape and with a rectilinear generatrix.

Advantageously, the electronic control unit 15 can be supplied with electrical energy by means of the electrical power supply cable 18.

Advantageously, the electronic control unit 15 can be arranged at least partially inside the casing 17 of the electromechanical actuator 11.

Furthermore, the electronic control unit 15 can be arranged at least partially outside the casing 17 of the electromechanical actuator 11 and, in particular, mounted on one of the two supports 23, on one of the cheeks 10 of the box 9 or in the torque support 21.

Here, the first electronic board 15*a* of the electronic control unit 15 is arranged inside the casing 17 of the electromechanical actuator 11. In addition, the second electronic board 15*b* is arranged inside the torque support 21 of the electromechanical actuator 11.

Here and as illustrated in FIGS. 3 to 9, the torque support 21 comprises a cover 22. In addition, the second electronic board 15*b* is arranged inside a housing formed between the second part 21*b* of the torque support 21 and the cover 22.

Advantageously, the torque support 21 comprises at least a button, not shown.

This button or these buttons may allow to perform an adjustment of the electromechanical actuator 11 through one or more configuration modes, to pair with the electromechanical actuator 11 one or more control units 12, 13, to reset one or more parameters, which may be, for example, an end-of-travel position, to reset the paired control unit(s) 12, 13 or to control the displacement of the screen 2.

Here, the torque support 21 comprises a single button.

The number of buttons on the torque support is not limiting and may be different. In particular, it may be greater than or equal to two.

Advantageously, the torque support 21 comprises at least a display device, not shown, so as to allow a visual indication, which may be, for example, a state of charge of the battery 24.

Advantageously, the display device comprises at least a light source, not shown, in particular a light-emitting diode, assembled on the second electronic board 15*b* and, eventually, a transparent or translucent cover and/or a light guide, to allow the passage of light emitted by the light source.

Here, the torque support 21 comprises a single display device.

The number of display devices is not limiting and may be different. In particular, it may be greater than or equal to two.

Advantageously, the output shaft 20 of the electromechanical actuator 11 is arranged inside the winding tube 4 and at least partially outside the casing 17 of the electromechanical actuator 11.

Here, an end of the output shaft 20 protrudes from the casing 17 of the electromechanical actuator 11, in particular from a second end 17*b* of the casing 17 opposite the first end 17*a*.

Advantageously, the output shaft 20 of the electromechanical actuator 11 is configured to drive in rotation a connecting element, not shown, connected to the winding tube 4. The connecting element is in the form of a wheel.

When the electromechanical actuator 11 is operated, the electric motor 16 and the gearbox 19 rotate the output shaft 20. In addition, the output shaft 20 of the electromechanical actuator 11 rotates the winding tube 4 via the connecting element.

Thus, the winding tube 4 rotates the screen 2 of the covering device 3, so as to open or close the opening 1.

The assembly of the torque support 21 relative to the casing 17 is now described with reference to FIGS. 3 to 9.

The casing 17 comprises at least an assembly element 37.

The or each assembly element 37 of the casing 17 may also be referred to as an "indexing element" of the casing 17.

Advantageously, the or each assembly element 37 of the casing 17 is arranged at the first end 17*a* of the casing 17.

Here, the casing 17 comprises two assembly elements 37.

Here, the two assembly elements 37 of the casing 17 are arranged at an angle of 180° relative to each other, around the axis of rotation X. In other words, the two assembly elements 37 of the casing 17 are diametrically opposed relative to the axis of rotation X.

The number and angular position of the assembly elements of the casing are not limiting and may be different. The number of assembly elements of the casing may be one or more and, for example, three in number and arranged at an angle of 120° to each other, around the axis of rotation.

Here, each assembly element 37 of the casing 17 is realized by a recessed area of the casing 17, in other words, by a deformation of the outer surface of the casing 17 in the direction of the axis of rotation X.

The or each assembly element 37 of the casing 17 may also be referred to as a "third assembly element".

The torque support 21, in particular the first part 21*a* of the torque support 21, comprises at least a first assembly element 38 and at least a second assembly element 39.

The or each first assembly element 38 of the torque support 21 may also be referred to as a "first indexing element" of the torque support 21. In addition, the or each second assembly element 39 of the torque support 21 may also be referred to as a "second indexing element" of the torque support 21.

Here, the torque support 21 comprises two first assembly elements 38 and two second assembly elements 39. The two first assembly elements 38 of the torque support 21 are arranged at an angle of 180° relative to each other, around the axis of rotation X. In other words, the first two assembly elements 38 of the torque support 21 are diametrically opposed relative to the axis of rotation X. The two second assembly elements 39 of the torque support 21 are arranged at an angle of 180° to each other, around the axis of rotation X. In other words, the two second assembly elements 39 of the torque support 21 are diametrically opposed relative to the axis of rotation X.

The number and angular position of the first and second assembly elements of the torque support are not limiting and may be different and, more particularly, are dependent on the number of assembly elements of the casing. The first and second assembly elements of the torque support may be one or strictly greater than two and, for example, three in number and arranged at an angle of 120° relative to each other, around the axis of rotation.

Advantageously, each of the first and second assembly elements 38, 39 of the torque support 21 and the or each assembly element 37 of the casing 17 are press-fit assembly elements. In addition, each of the first and second assembly elements 38, 39 of the torque support 21 is configured to cooperate, in other words cooperates, with the or one of the assembly elements 37 of the casing 17 by form-fit cooperation.

Here, each first assembly element 38 of the torque support 21 is formed by a recessed area of the torque support 21, in other words by a deformation in the direction of the axis of rotation X. In addition, each second assembly element 39 of the torque support 21 is formed by a recessed area of the torque support 21, in other words by a deformation in the direction of the axis of rotation X.

Here, the first assembly elements 38 are identical to each other and the second assembly elements 39 are identical to each other.

Each first assembly element 38 of the torque support 21 is configured to be assembled, in other words is assembled, with one of the assembly elements 37 of the casing 17, according to the first assembly configuration of the torque support 21 relative to the casing 17. The first assembly configuration corresponds to a functional assembly configuration of the electromechanical actuator 11.

The functional assembly configuration of the electromechanical actuator 11 corresponds to a final assembly configuration of the electromechanical actuator 11 wherein the electromechanical actuator 11 is suitable for use in the installation 6, in other words assembled and configured to rotate the winding tube 4 of the covering device 3.

According to the first assembly configuration, the torque support 21 is oriented and rotationally blocked around the axis of rotation X relative to the casing 17, via the first assembly elements 38 of the torque support 21 and assembly elements 37 of the casing 17.

Each second assembly element 39 of the torque support 21 is different from a first assembly element 38 of the torque support 21.

Here, each second assembly element 39 has a different shape than that of a first assembly element 38.

Each second assembly element 39 of the torque support 21 is configured to be assembled, in other words is assembled, with one of the assembly elements 37 of the casing 17, according to the second assembly configuration of the torque support 21 relative to the casing 17. The second assembly configuration corresponds to a testing configuration of the electromechanical actuator 11.

According to the second assembly configuration, the torque support 21 is oriented and rotationally blocked around the axis of rotation X relative to the casing 17, via the second assembly elements 39 of the torque support 21 and assembly elements 37 of the casing 17.

Thus, the or each first assembly element 38 of the torque support 21 is different from the or each second assembly element 39 of the torque support 21, such that, according to the first assembly configuration of the torque support 21 relative to the casing 17, the or each first assembly element 38 of the torque support 21 is assembled, in other words is configured to be assembled, with the or one of the assembly elements 37 of the casing 17 to ensure a functional assembly configuration of the electromechanical actuator 11, and that, according to the second assembly configuration of the torque support 21 relative to the casing 17, the or each second assembly element 39 of the torque support 21 is assembled, in other words is configured to be assembled, with the or one of the assembly elements 37 of the casing 17 to ensure a testing configuration of the electromechanical actuator 11.

In this way, such an electromechanical actuator 11 allows to ensure an assembly of the torque support 21 relative to the casing 17 according to at least a first position, in a first functional assembly configuration of the electromechanical actuator 11, and according to at least a second position, in a second additional assembly configuration of the electromechanical actuator 11 which is the one of the testing of the electromechanical actuator 11 and which is therefore different from the first functional assembly configuration of the electromechanical actuator 11.

The torque support 21 can thus be assembled relative to the casing 17 according to at least two distinct positions, in particular according to the first and second assembly configurations, of which a first assembly position of the torque support 21 relative to the casing 17 is a functional assembly position of the electromechanical actuator 11, where the torque support 21 is configured to be attached to the casing 17, and a second assembly position of the torque support 21 relative to the casing 17 is a testing position of the electromechanical actuator 11, where the testing position is different from the functional assembly position of the electromechanical actuator 11.

Furthermore, such an electromechanical actuator 11 allows the torque support 21 to be assembled relative to the casing 17 according to the first and second assembly configurations at the same workstation of a manufacturing unit, so as to minimize an assembly time of the electromechanical actuator 11 and to limit investments for obtaining the manufacturing unit.

Advantageously, the second assembly configuration, corresponding to a testing configuration of the electromechanical actuator 11, is intended to be used in the factory to perform a testing of the electromechanical actuator 11.

More particularly, the second assembly configuration, corresponding to a testing configuration of the electromechanical actuator 11, is intended to be used in the factory to perform a measurement of an intensity on an electric current flowing in the electromechanical actuator 11, in particular when the latter is configured to be equipped with the battery 24. Preferably, the measurement of the intensity of the electromechanical actuator 11 current flow is implemented prior to the assembly of the battery 24 inside the casing 17 and prior to the electrical connection of the battery 24 to the electronic control unit 15, in particular to the first electronic board **15*a*, by means of the power supply cable 18**.

Thus, a measurement of the intensity of the electromechanical actuator 11 current flow can be implemented in the absence of the battery 24 and when the torque support 21, in particular the first part **21*a* of the torque support 21, is partially inserted into the casing 17, in particular according to the second assembly configuration of the torque support 21 relative to the casing 17**.

In this way, the measurement of the intensity of the electromechanical actuator 11 current allows to check the compatibility of the battery 24 to be assembled in the electromechanical actuator 11 with the electronic control unit 15 and the electric motor 16, prior to the assembly of the battery 24 inside the casing 17 and prior to the electrical connection of the battery 24 to the electronic control unit 15, in particular to the first electronic board **15*a*, by means of the power supply cable 18**.

Advantageously, the passage from the first assembly configuration to the second assembly configuration, and vice versa, is implemented by a rotational movement R, around the rotation axis X, of the torque support 21 relative to the casing 17.

The torque support 21 is configured to be oriented, in other words is oriented, relative to the casing 17, around the axis of rotation X of the electromechanical actuator 11 and in the first assembly configuration, with a first orientation of the torque support 21 relative to the casing 17. The torque support 21 is also configured to be oriented, in other words is oriented, relative to the casing 17, around the axis of rotation X and in the second assembly configuration, with a second orientation of the torque support 21 relative to the casing 17. In addition, the first and second orientations of the torque support 21 relative to the casing 17 are offset from each other, around the axis of rotation X, by a predetermined non-zero angular value $\alpha$.

Advantageously, the predetermined angular value α is in a range of values extending between 20° and 160° and is preferably of the order of 90°.

Advantageously, the first and second orientations of the torque support 21 relative to the casing 17 are determined by an angular positioning of the or each first assembly element 38 of the torque support 21 relative to the or each second assembly element 39 of the torque support 21, around the axis of rotation X.

Advantageously, the or each second assembly element 39 of the torque support 21 is configured to be housed, in other words is housed, within the casing 17, according to the first assembly configuration.

Thus, according to the first assembly configuration, the or each second assembly element 39 of the torque support 21 is offset relative to the or one of the assembly elements 37 of the casing 17, around the axis of rotation X, so as not to interfere with the or one of the assembly elements 37 of the casing 17.

Advantageously, the or each first assembly element 38 of the torque support 21 is configured to be housed, in other words is housed, within the casing 17, according to the second assembly configuration.

Thus, according to the second assembly configuration, the or each first assembly element 38 of the torque support 21 is offset relative to the or one of the assembly elements 37 of the casing 17, around the axis of rotation X, so as not to interfere with the or one of the assembly elements 37 of the casing 17.

Advantageously, the first assembly element 38 of the torque support 21 comprises a first stop 43. The second assembly element 39 of the torque support 21 comprises a second stop 44. The casing 17 comprises an edge 45 at the first end 17*a* of the casing 17. The edge 45 of the casing 17 is configured to abut, in other words is abutted, with the first stop 43 of the first assembly element 38 of the torque support 21, in the first assembly configuration, so that the torque support 21, in particular the first part 21*a* of the torque support 21, is inserted partially within the casing 17 according to a first predetermined distance L1 parallel to the axis of rotation X of the electromechanical actuator 11. The edge 45 of the casing 17 is also configured to abut, in other words is abutted, with the second stop 44 of the second assembly element 39 of the torque support 21, in the second assembly configuration, so that the torque support 21, in particular the first part 21*a* of the torque support 21, is inserted partially inside the casing 17 according to a second predetermined distance L2 parallel to the axis of rotation X. In addition, the first predetermined distance L1 is greater than the second predetermined distance L2.

Advantageously, each of the first and second predetermined distances L1, L2 for insertion of the torque support 21 within the casing 17, along the axis of rotation X and in each of the first and second assembly configurations, is defined by a length between the edge 45 of the casing 17, at the first end 17*a* of the casing 17, and an edge 46 of the torque support 21, in particular of the first part 21*a* of the torque support 21, at an end 21*c* of the torque support 21 configured to be inserted into the casing 17.

Advantageously, the torque support 21 comprises at least a notch 40. In addition, the notch 40 of the torque support 21 is configured to be closed by the casing 17, in the first assembly configuration, and to be open relative to the casing 17, in other words not totally obstructed by it, in the second assembly configuration.

Thus, the notch 40 is configured to allow the testing of the electromechanical actuator 11, in particular the measurement of the intensity of the electromechanical actuator 11 current flow, when the torque support 21 is assembled relative to the casing 17, according to the second assembly configuration.

The notch 40 of the torque support 21 may also be referred to as an "opening", in particular a through opening, or an "indentation".

Advantageously, the notch 40 of the torque support 21 is formed in the or each second assembly element 39 of the torque support 21.

Advantageously, the notch 40 of the torque support 21 is configured for the passage of at least one power supply cable 41, from the interior of the casing 17 to the exterior of the casing 17, in the second assembly configuration.

Thus, according to the second assembly configuration, the power supply cable 41 extends, on the one hand, inside the casing 17 and, on the other hand, outside the casing 17 and passes through the notch 40 of the torque support 21.

Advantageously, the electronic control unit 15, in particular the first electronic board 15*a*, is configured to be connected electrically to a control tool 47 via an electrical connection L, in the second assembly configuration.

Advantageously, in the second assembly configuration, the electrical connection L between the electronic control unit 15, in particular the first electronic board 15*a*, and the control tool 47 is implemented by the power supply cable 41 extending through the notch 40 provided in the torque support 21.

Here, the power supply cable 41 is configured to be connected electrically, in other words is connected electrically, to the electronic control unit 15, in particular to the first electronic board 15*a* of the electronic control unit 15, in the first and second assembly configurations.

Advantageously, the power supply cable 41 comprises an electrical connector 42. In addition, the electrical connector 42 of the power supply cable 41 is configured to cooperate with an electrical connector, not shown, of the control tool 47.

Advantageously, following the test of the electromechanical actuator 11, in the second assembly configuration, the battery 24 is inserted inside the casing 17 and then the torque support 21 is assembled with the casing 17 according to the first assembly configuration.

Advantageously, the battery 24 comprises an electrical connector, not shown. In addition, the electrical connector of the battery 24 is configured to be connected electrically, in other words is connected electrically, to the electrical connector 42 of the power supply cable 41, prior to the insertion of the battery 24 inside the casing 17.

Thus, the electrical connector 42 of the power supply cable 41 allows, on the one hand, to supply electrical power to the electronic control unit 15, in particular the first electronic board 15*a*, and to the electric motor 16, according to the first assembly configuration, and, on the other hand, to implement the testing of the electromechanical actuator 11, according to the second assembly configuration.

Advantageously, the casing 17 and the torque support 21 are configured to be fixed together, in other words are fixed together, by means of at least one fastening element 48, only according to the first assembly configuration.

Thus, according to the first assembly configuration, the attachment of the casing 17 with the torque support 21 allows the torque support 21 to be translationally blocked relative to the casing 17.

In addition, the attachment of the casing 17 with the torque support 21 is implemented according to the first assembly configuration and not according to the second assembly configuration.

In this way, the second assembly configuration is a temporary assembly configuration of the torque support 21 relative to the casing 17.

Advantageously, the attachment of the casing 17 with the torque support 21, according to the first assembly configuration, is implemented following the insertion of the battery 24 inside the casing 17.

Here, the fastening element(s) 48 of the casing 17 with the torque support 21 are screw fastening elements, in particular fastening screws that may be, for example, self-tapping screws.

The type of the fastening elements of the casing with the torque support is not limiting and can be different. It may be, for example, fastening elements by riveting or by elastic snapping.

Advantageously, the casing 17 comprises at least a through hole 49 of a fastening element 48. In addition, the torque support 21 comprises at least a fastening hole 50 of a fastening element 48.

Here, the electromechanical actuator 11 comprises two fastening elements 48. The casing 17 comprises two through holes 49. In addition, the torque support 21 comprises two fastening holes 50. The number of through holes 49 of the casing 17 and the number of fastening holes 50 of the torque support 21 is dependent on the number of fastening elements 48.

The number of fastening elements, through holes of the casing and fastening holes of the torque support is not limiting and may be different. It may be, for example, one or strictly greater than two.

Here, each fastening screw 48 passes through one of the through holes 49 of the casing 17 and is screwed into one of the fastening holes 50 of the torque support 21.

Advantageously, at least one through hole 49 of the casing 17 is formed in an assembly element 37 of the casing 17. In addition, at least one fastening hole 50 of the torque support 21 is provided in a first assembly element 38 of the torque support 21.

Advantageously, the number of through holes 49 in the casing 17 and the number of fastening holes 50 in the torque support 21 is dependent on the number of first assembly elements 38 in the torque support 21, and vice versa.

Here, each through hole 49 of the casing 17 is formed in one of the assembly elements 37 of the casing 17. In addition, each fastening hole 50 of the torque support 21 is provided in one of the first assembly elements 38 of the torque support 21.

Thanks to the present invention, the first assembly element of the torque support is different from the second assembly element of the torque support, such that the first assembly element of the torque support is assembled with the assembly element of the casing to ensure a functional assembly configuration of the electromechanical actuator, in the first assembly configuration of the torque support relative to the casing, and that the second assembly element of the torque support is assembled with the assembly element of the casing to ensure a testing configuration of the electromechanical actuator, in the second assembly configuration of the torque support relative to the casing.

In this manner, such an electromechanical actuator ensures that the torque support is assembled relative to the casing according to at least a first position, in a first functional assembly configuration of the electromechanical actuator, and according to at least a second position, in an additional second electromechanical actuator assembly configuration that is the testing configuration of the electromechanical actuator and is therefore different from the first functional assembly configuration of the electromechanical actuator.

Numerous modifications can be made to the above-described example of embodiments, without departing from the scope of the invention defined by the claims.

In a variant, not shown, the electromechanical actuator 11 is inserted into a rail, in particular of square or rectangular cross-section, which may be open at one or both ends, in the assembled configuration of the covering device 3. Furthermore, the electromechanical actuator 11 may be configured to drive a drive shaft on which cords for moving and/or orienting the screen 2 are wound.

In a variant, not shown, the electromechanical actuator 11 is supplied with electrical energy from a mains power supply.

In addition, the contemplated embodiments and variants may be combined to generate new embodiments of the invention, without departing from the scope of the invention defined by the claims.

The invention claimed is:

1. An electromechanical actuator for a closure, covering or solar protection installation, the electromechanical actuator comprising a casing comprising an assembly element;

an electric motor assembled within the casing in an assembled configuration of the electromechanical actuator; and a torque support disposed at a first end of the casing in the assembled configuration of the electromechanical actuator, the torque support comprising at least one first assembly element configured to be assembled with the assembly element of the casing, according to a first assembly configuration of the torque support relative to the casing, the first assembly configuration corresponding to a functional assembly configuration of the electromechanical actuator in which the electromechanical actuator is used in the closure, covering, or solar protection installation, and at least one second assembly element different in shape from the at least one first assembly element of the torque support, the at least one second assembly element of the torque support being configured to be assembled with the assembly element of the casing, according to a second assembly configuration of the torque support relative to the casing, the second assembly configuration corresponding to a testing configuration of the electromechanical actuator in which a testing of the electromechanical actuator is able to be performed, wherein the torque support is configured to be rotated relative to the casing, around an axis of rotation of the electromechanical actuator and in the first assembly configuration, into a first orientation of the torque support relative to the casing, the torque support is configured to be rotated relative to the casing, around the axis of rotation and in the second assembly configuration, into a second orientation of the torque support relative to the casing, and the first and second orientations of the torque support relative to the casing are offset from each other, around the axis of rotation, by a predetermined non-zero angular value.

2. The electromechanical actuator for the closure, covering or solar protection installation according to claim 1, wherein the torque support further comprises a notch configured to be closed by the casing, in the first assembly configuration, and to be open relative to the casing, in the second assembly configuration.

3. The electromechanical actuator for the closure, covering or solar protection installation according to claim 2, wherein the notch of the torque support is disposed in the second assembly element of the torque support.

4. The electromechanical actuator for the closure, covering or solar protection installation according to claim 2, wherein the notch of the torque support is configured for a passage of at least one power supply cable, from the inside of the casing to the outside of the casing, in the second assembly configuration.

5. The electromechanical actuator for the closure, covering or solar protection installation according to claim 1, wherein the first and second orientations of the torque support relative to the casing are determined by an angular positioning of the first assembly element of the torque support relative to the second assembly element of the torque support, around the axis of rotation.

6. The electromechanical actuator for the closure, covering or solar protection installation according to claim 1, wherein each of the first and second assembly elements of the torque support and the assembly element of the casing are press-fit assembly elements, and wherein each of the first and second assembly elements of the torque support is configured to cooperate with the assembly element of the casing in a form-fit manner.

7. The electromechanical actuator for the closure, covering or solar protection installation according to claim 1, wherein:

the first assembly element of the torque support comprises a first stop, the second assembly element of the torque support comprises a second stop, the casing comprises an edge at the first end of the casing, the edge of the casing being configured to abut the first stop of the first assembly element of the torque support, in the first assembly configuration, so that the torque support is inserted partially within the casing according to a first predetermined distance parallel to an axis of rotation of the electromechanical actuator, the edge of the casing being configured to abut the second stop of the second assembly element of the torque support, in the second assembly configuration, so that the torque support is inserted partially inside the casing according to a second predetermined distance parallel to the axis of rotation, the first predetermined distance being greater than the second predetermined distance.

8. The electromechanical actuator for the closure, covering or solar protection installation according to claim 1, wherein the electromechanical actuator comprises at least a battery, the battery being arranged inside the casing, in the assembled configuration of the electromechanical actuator.

9. The electromechanical actuator for the closure, covering or solar protection installation according to claim 1, wherein the electromechanical actuator comprises an electronic control unit configured to be connected electrically to a control tool via an electrical connection, in the second assembly configuration.

10. The electromechanical actuator for the closure, covering or solar protection installation according to claim 9, wherein the torque support further comprises a notch configured to be closed by the casing, in the first assembly configuration, and to be open relative to the casing, in the second assembly configuration, wherein the notch of the torque support is configured for a passage of at least one power supply cable, from the inside of the casing to the outside of the casing, in the second assembly configuration, and wherein, in the second assembly configuration, the electrical connection between the electronic control unit and the control tool is implemented by the power supply cable extending through the notch provided in the torque support.

11. A closure, covering or solar protection installation comprising:

a winding tube;

a screen configured to be rolled on the winding tube; and the electromechanical actuator according to claim 1, the winding tube being configured to be driven in rotation by the electromechanical actuator.

12. The electromechanical actuator for the closure, covering or solar protection installation according to claim 3, wherein the notch of the torque support is configured for the passage of at least one power supply cable, from the inside of the casing to the outside of the casing, in the second assembly configuration.

13. The electromechanical actuator for the closure, covering or solar protection installation according to claim 2, wherein the first and second orientations of the torque support relative to the casing are determined by an angular positioning of the first assembly element of the torque support relative to the second assembly element of the torque support, around the axis of rotation.

14. An electromechanical actuator for a closure, covering or solar protection installation, the electromechanical actuator comprising a casing comprising an assembly element;

an electric motor assembled within the casing in an assembled configuration of the electromechanical actuator; and a torque support disposed at a first end of the casing in the assembled configuration of the electromechanical actuator, the torque support comprising at least one first assembly element configured to be assembled with the assembly element of the casing, according to a first assembly configuration of the torque support relative to the casing, the first assembly configuration corresponding to a functional assembly configuration of the electromechanical actuator, at least one second assembly element different from the at least one first assembly element of the torque support, the at least one second assembly element of the torque support being configured to be assembled with the assembly element of the casing, according to a second assembly configuration of the torque support relative to the casing, the second assembly configuration corresponding to a testing configuration of the electromechanical actuator, and a notch configured to be closed by the casing, in the first assembly configuration, and to be open relative to the casing, in the second assembly configuration, wherein the torque support is configured to be rotated relative to the casing, around an axis of rotation of the electromechanical actuator and in the first assembly configuration, into a first orientation of the torque support relative to the casing, the torque support is configured to be rotated relative to the casing, around the axis of rotation and in the second assembly configuration, into a second orientation of the torque support relative to the casing, and the first and second orientations of the torque support relative to the casing are offset from each other, around the axis of rotation, by a predetermined non-zero angular value.

15. The electromechanical actuator for the closure, covering or solar protection installation according to claim 14, wherein the notch of the torque support is disposed in the second assembly element of the torque support.

16. The electromechanical actuator for the closure, covering or solar protection installation according to claim 14, wherein the notch of the torque support is configured for a passage of at least one power supply cable, from the inside of the casing to the outside of the casing, in the second assembly configuration.

17. An electromechanical actuator for a closure, covering or solar protection installation, the electromechanical actuator comprising a casing comprising an assembly element;

an electric motor assembled within the casing in an assembled configuration of the electromechanical actuator; and a torque support disposed at a first end of the casing in the assembled configuration of the electromechanical actuator, the torque support comprising at least one first assembly element configured to be assembled with the assembly element of the casing, according to a first assembly configuration of the torque support relative to the casing, the first assembly configuration corresponding to a functional assembly configuration of the electromechanical actuator, the at least one first assembly element of the torque support comprises a first stop, and at least one second assembly element different from the at least one first assembly element of the torque support, the at least one second assembly element of the torque support being configured to be assembled with the assembly element of the casing, according to a second assembly configuration of the torque support relative to the casing, the second assembly configuration corresponding to a testing configuration of the electromechanical actuator, the at least one second assembly element of the torque support comprises a second stop, wherein the torque support is configured to be rotated relative to the casing, around an axis of rotation of the electromechanical actuator and in the first assembly configuration, into a first orientation of the torque support relative to the casing, the torque support is configured to be rotated relative to the casing, around the axis of rotation and in the second assembly configuration, into a second orientation of the torque support relative to the casing, the first and second orientations of the torque support relative to the casing are offset from each other, around the axis of rotation, by a predetermined non-zero angular value, and the casing comprises an edge at the first end of the casing, the edge of the casing being configured to abut the first stop of the first assembly element of the torque support, in the first assembly configuration, so that the torque support is inserted partially within the casing according to a first predetermined distance parallel to an axis of rotation of the electromechanical actuator, the edge of the casing being configured to abut the second stop of the second assembly element of the torque support, in the second assembly configuration, so that the torque support is inserted partially inside the casing according to a second predetermined distance parallel to the axis of rotation, the first predetermined distance being greater than the second predetermined distance.

18. The electromechanical actuator for the closure, covering or solar protection installation according to claim 17, wherein the torque support further comprises a notch configured to be closed by the casing, in the first assembly configuration, and to be open relative to the casing, in the second assembly configuration.

19. The electromechanical actuator for the closure, covering or solar protection installation according to claim 18, wherein the notch of the torque support is disposed in the second assembly element of the torque support.

20. The electromechanical actuator for the closure, covering or solar protection installation according to claim 18, wherein the notch of the torque support is configured for a passage of at least one power supply cable, from the inside of the casing to the outside of the casing, in the second assembly configuration.

* * * * *